United States Patent
Murphy et al.

(10) Patent No.: US 9,260,249 B2
(45) Date of Patent: Feb. 16, 2016

(54) SUPPORT ASSEMBLY FOR SUPPORTING PART OF A MACHINE

(71) Applicant: Terex GB Limited, Dungannon (GB)

(72) Inventors: Glenn Murphy, Craigavon (GB); Oliver Donnelly, Moy (GB)

(73) Assignee: Terex GB Limited, Dungannon, County Tyrone (GB)

( * ) Notice: Subject to any disclaimer, the term of this patent is extended or adjusted under 35 U.S.C. 154(b) by 14 days.

(21) Appl. No.: 14/074,352

(22) Filed: Nov. 7, 2013

(65) Prior Publication Data

US 2014/0124339 A1    May 8, 2014

(30) Foreign Application Priority Data

Nov. 8, 2012    (GB) .................................. 1220156.2

(51) Int. Cl.
*B65G 21/10* (2006.01)
*B65G 21/14* (2006.01)
*B65G 21/00* (2006.01)
*B02C 21/02* (2006.01)

(52) U.S. Cl.
CPC .............. *B65G 21/00* (2013.01); *B02C 21/026* (2013.01); *Y10T 403/32* (2015.01)

(58) Field of Classification Search
CPC ................................ B65G 21/10; B65G 21/14
USPC ................. 198/586, 589, 592, 861.1
See application file for complete search history.

(56) References Cited

U.S. PATENT DOCUMENTS

| | | | |
|---|---|---|---|
| 3,348,678 A * | 10/1967 | Flowers ........................ | 209/595 |
| 3,552,546 A | 1/1971 | Rath | |
| 4,852,715 A * | 8/1989 | Kmetz ........................ | 198/369.2 |
| 6,227,357 B1 * | 5/2001 | Brown, Sr. .................. | 198/861.4 |
| 6,360,876 B1 * | 3/2002 | Nohl et al. ..................... | 198/588 |
| 6,899,511 B2 * | 5/2005 | Gurevich et al. .......... | 414/749.1 |
| 6,929,115 B2 * | 8/2005 | Monti ........................ | 198/861.1 |
| 7,234,590 B1 * | 6/2007 | Le Borgne ................ | 198/861.5 |
| 7,328,810 B1 | 2/2008 | Rhodes | |
| 7,552,818 B2 * | 6/2009 | Makinen et al. ........... | 198/861.2 |
| 7,849,999 B1 * | 12/2010 | Cooley et al. ................. | 198/813 |
| 8,210,109 B1 * | 7/2012 | Dewees ........................ | 108/147 |
| 8,322,511 B2 * | 12/2012 | Leifheit ..................... | 198/347.1 |
| 8,540,071 B2 * | 9/2013 | Dowling .................... | 198/861.1 |
| 8,701,894 B2 * | 4/2014 | Carter ........................... | 209/242 |
| 8,770,386 B2 * | 7/2014 | Berning et al. ............... | 198/617 |
| 2006/0043718 A1 | 3/2006 | Mayer | |

OTHER PUBLICATIONS

Partial European Search Report, dated Nov. 19, 2014, for European patent application EP 13191478, corresponding to U.S. Appl. No. 14/074,352.

* cited by examiner

*Primary Examiner* — Douglas Hess
(74) *Attorney, Agent, or Firm* — Warner Norcross & Judd LLP

(57) ABSTRACT

A support assembly for supporting a part of a machine, the support assembly comprising at least one support member for supporting a part of the machine on a base, the support member being slidably mounted on a mounting member on the base to be displaceable with respect to the mounting member between a retracted position and an extended position, a jacking leg extending from a lower end of the mounting member to be displaceable between a retracted position and an extended position, a ram acting between the jacking leg and the support member, said ram being operable to move the jacking leg between its retracted and extended positions and to move the support member between its retracted and extended positions to adjust the position of said part of the machine relative to the base.

20 Claims, 6 Drawing Sheets ated position and an extended position, a jacking leg extending from a lower end of the mounting member to be displaceable between a retracted position and an extended position, a ram acting between the jacking leg and the support member, said ram being operable to move the jacking leg between its retracted and extended positions and to move the support member between its retracted and extended positions to adjust the position of said part of the machine relative to the base.
SUPPORT ASSEMBLY FOR SUPPORTING PART OF A MACHINE

FIELD OF THE INVENTION

The present invention relates to a support assembly for a feed conveyor of a material processing apparatus and particularly, but not exclusively, to a support assembly for a feed conveyor of an aggregate processing machine.

BACKGROUND TO THE INVENTION

It is known to provide mobile self-propelled crushing and screening machines for processing materials, such as aggregates, in a quarry or for recycling demolition waste.

Such machines typically comprise a chassis having one or more material processing devices mounted thereon for screening, separating, crushing and/or washing one or more types of aggregate material, for example rocks, stones, gravel, sand and/or soil, or any other material that is quarried, mined or excavated.

Typically, the processing machine is mobile and comprises one or more wheels and/or tracks mounted on the chassis. The machine is usually self-propelled incorporating a drive unit, such as an engine, for driving the wheels and/or tracks.

Typically a feed hopper is provided for receiving material to be processed, the hopper being mounted above a loading end of a feed conveyor, the feed conveyor having a discharge end for delivering the material to the one or more material processing devices.

It is desirable to locate the feed hopper at a relatively low level to reduce the need to raise material to be loaded into the feed hopper onto the feed conveyor. The discharge end of the feed conveyor is required to be located at a higher level so that the material can be fed under the action of gravity to said one or more processing devices, such as a crushing device or screening device. Therefore the feed conveyor is typically upwardly inclined. However, if the angle of inclination of the feed conveyor is too steep, the feed conveyor may be unable to deliver heavier material to the one or more processing devices as the material may simply roll down the conveyor. Therefore it is desirable to permit adjustment of the angle of inclination of the feed conveyor to suit the material being processed.

SUMMARY OF THE INVENTION

A first aspect of the invention provides an apparatus for coupling first and second parts to an intermediate part, said apparatus comprising a first member connectable to said first part, said first member being mounted on a mounting member connectable to said intermediate part such that said first member can be moved between an extended position and a retracted position with respect to said mounting member to adjust the position of the first part with respect to said intermediate part, the apparatus further comprising a second member connectable to said second part, said second member being mounted on said mounting member such that said second member can be moved between an extended position and a retracted position with respect to said mounting member to adjust the position of the second part with respect to said intermediate part, an actuator acting between the first member and the second member, said actuator being operable to move the first member between its retracted and extended positions and to move the second member between its retracted and extended positions.

In a second aspect the present invention provides a support assembly for supporting a part of a machine, the support assembly comprising at least one support member for supporting a part of the machine on a base, the support member being slidably mounted on a mounting member on the base to be displaceable with respect to the mounting member between a retracted position and an extended position, a jacking leg extending from a lower end of the mounting member to be displaceable between a retracted position and an extended position, a ram acting between the jacking leg and the support member, said ram being operable to move the jacking leg between its retracted and extended positions and to move the support member between its retracted and extended positions to adjust the position of said part of the machine relative to the base.

A third aspect of the invention provides a material processing machine comprises a feed conveyor, wherein a loading end of the feed conveyor is support on a support assembly in accordance with the second aspect of the invention.

A fourth aspect of the invention provides a material processing machine comprising a chassis having at least one material processing device mounted thereon and a feed conveyor for feeding material to said at least one material processing device, said feed conveyor having a loading end and a discharge end, the loading end of the feed conveyor being supported on the chassis via a support assembly adapted to enable adjustment the height of the loading end of the feed conveyor with respect to the chassis, and thus adjustment of the angle of inclination of the feed conveyor.

A further aspect of the invention provides a mobile aggregate processing apparatus comprising in operative combination:

a frame having a longitudinal direction:

at least one material processing plant configured to perform at least one of feeding material, washing material, sorting material into first predetermined material dimension groups and crushing material with a first larger dimension characteristic into material having a first smaller dimension characteristic;

a feed conveyor having a loading end and a discharge end, material from said discharge end being delivered to said material processing plant, wherein the loading end of the feed conveyor is supported on an elongate support beam extending transverse to the longitudinal direction of the frame;

a tubular support member being provided at each end of the support beam, each support member being mounted on a respective mounting member provided on each side of the frame to be displaceable with respect to the respective mounting member between a lowered position and a raised position;

an elongate jacking leg being mounted on each mounting member to be displaceable with respect to the respective mounting member extendable between a retracted position to an extended ground engaging position;

a ram being associated with each jacking leg, each ram acting between the respective jacking leg and the associated support member such that extension of the rams may extend the jacking legs towards their extended ground engaging position and may extend the support members from their lowered position to their raised position to raise the support beam and thus raise the loading end of the feed conveyor.

Preferred features of the invention are recited in the dependent claims.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
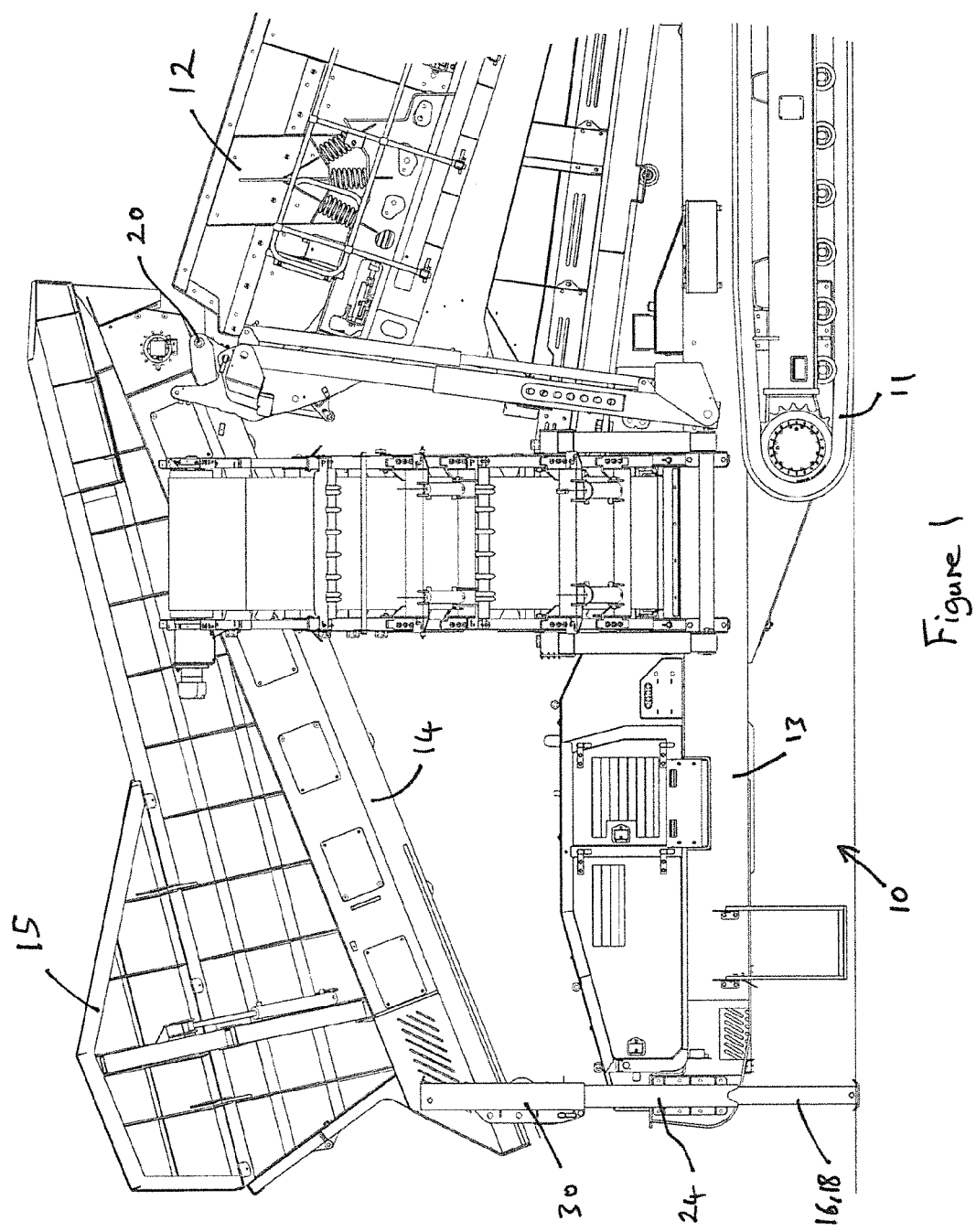
FIG. 1 is a side view of a mobile aggregate processing machine including a feed conveyor support assembly embodying the invention.

Referring now to FIG. 1 of the drawings, there is shown, generally indicated as 10, an aggregate or other material processing machine. The processing machine 10 is configured for performing, by way of example, aggregate or other material screening and, as such, in the example shown comprises a screening plant in particular an aggregate screening plant 12.

Alternatively, however, the machine 10 may be configured to perform any one or more of a plurality of processes, such as feeding, screening, separating, crushing and/or washing, on one or more types of aggregate material, for example rocks, stones, gravel, sand and/or soil, or any other material that is quarried, mined or excavated. To this end, the machine 10 may include one or more material processing plants adapted to perform one or more of the foregoing processes.

Typically, the processing machine 10 is mobile and comprises one or more wheels and/or tracks 11 mounted on a chassis 13. The machine 10 may be self-propelled and to this end may comprise a drive system, e.g. comprising an engine, for driving the wheels or tracks 11 as applicable. In cases where the machine 10 is towable, it is usually provided with wheels for this purpose.

In the illustrated example, the processing machine 10 comprises a feed conveyor 14 for feeding material to the material processing plant 12, the feed conveyor 14 having loading end, preferably at a rear end of the chassis 13, and a discharge end for feeding material to said material processing plant 12, the feed conveyor 14 being mounted on the chassis 13 such that the conveying surface thereof is inclined upwardly from the loading end to the discharge end of the feed conveyor 14. A feed hopper 15 is mounted above the loading end of the feed conveyor 14 for receiving material to be processed.

The feed conveyor 14 is mounted on the chassis 13 of the machine 10 such that the height of the loading end of the feed conveyor 14, and thus the angle of inclination of the feed conveyor 14, can be adjusted, as will be described in more detail below.

In order to provide stability for the machine 10, a pair of jacking legs 16,18 are mounted on either side of the chassis 13 at a rear end thereof, adjacent the feed hopper 15 of the feed conveyor 14. The jacking legs 16,18 are mounted on the chassis 13 to be vertically extendable between a retracted or raised position, allowing the machine 10 to be moved over the ground, and an extended or lowered position (shown in FIG. 1), wherein the jacking legs 16,18 engage the ground to support the rear end of the machine 10.

Figure 2:
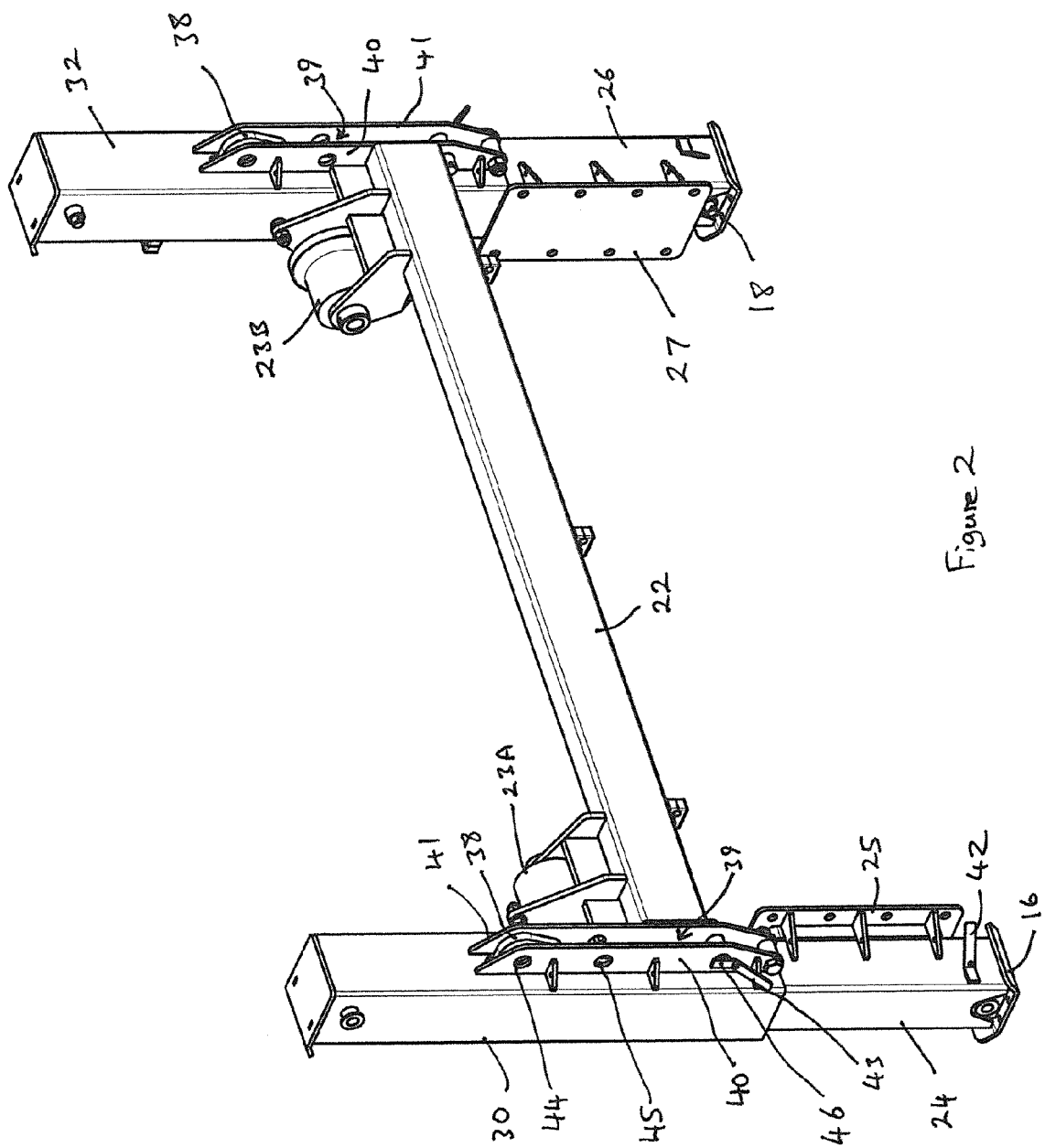
FIG. 2 is a perspective partial view of the support assembly of FIG. 1.
Figure 3:
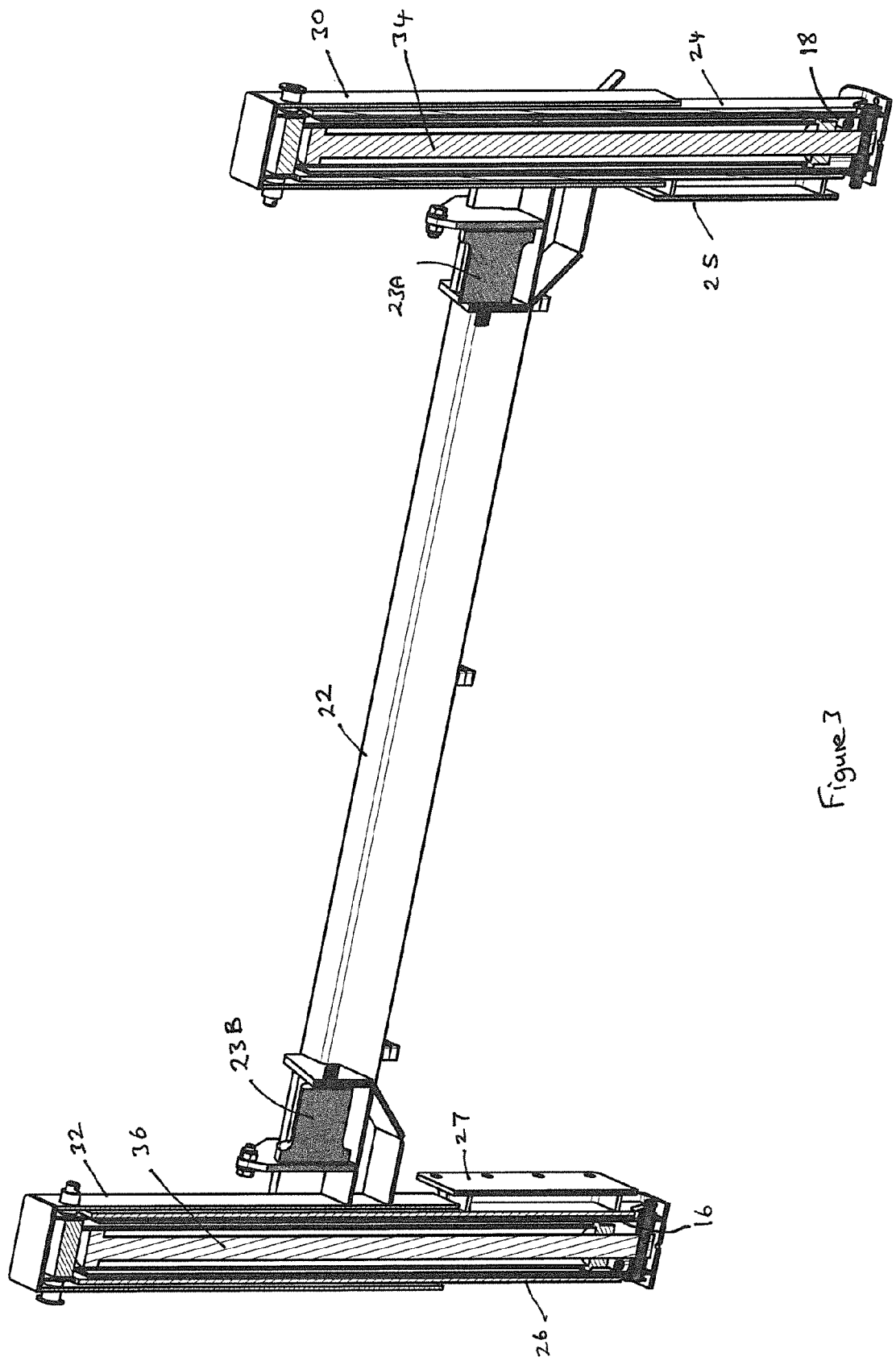
FIG. 3 is a sectional perspective view of the support assembly of FIG. 1.
Figure 4:
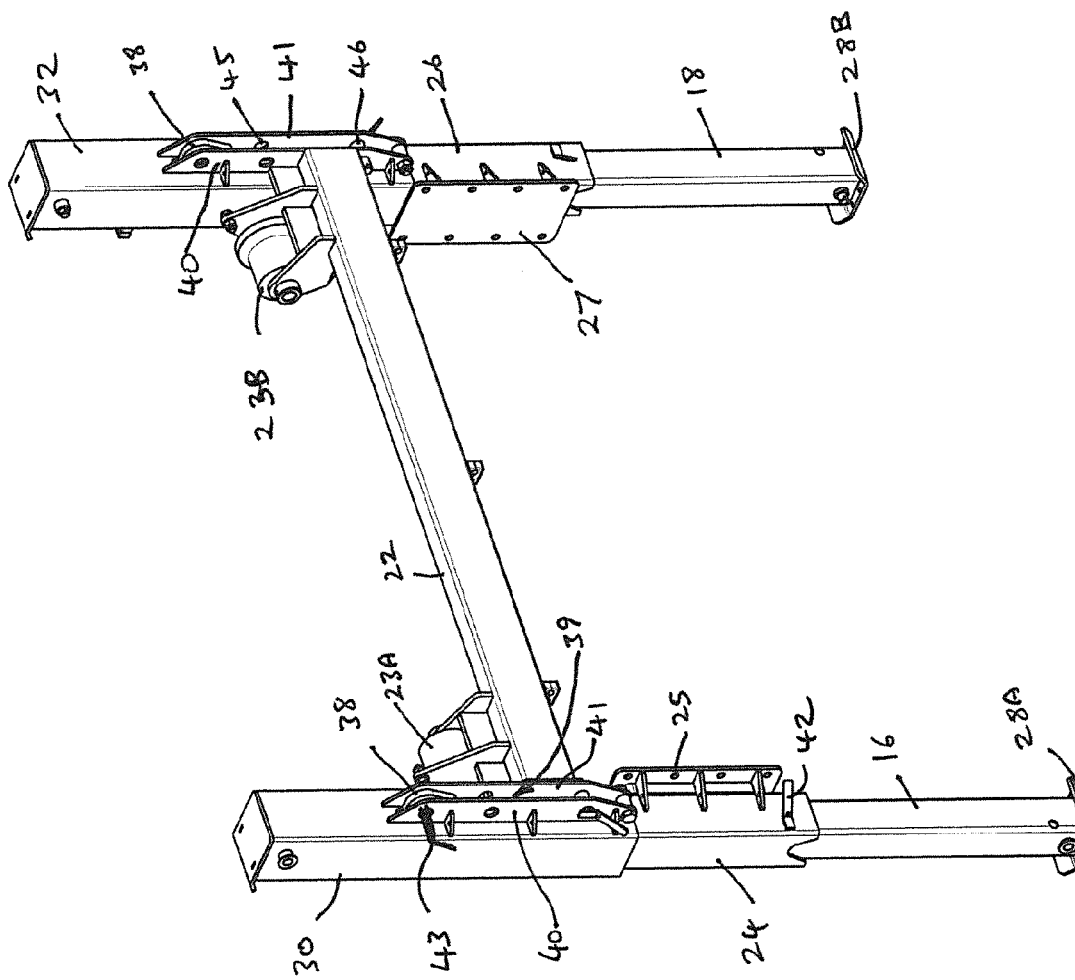
FIG. 4 is a perspective partial view of the support assembly of FIG. 1, showing the jacking legs in their extended position.
Figure 5:
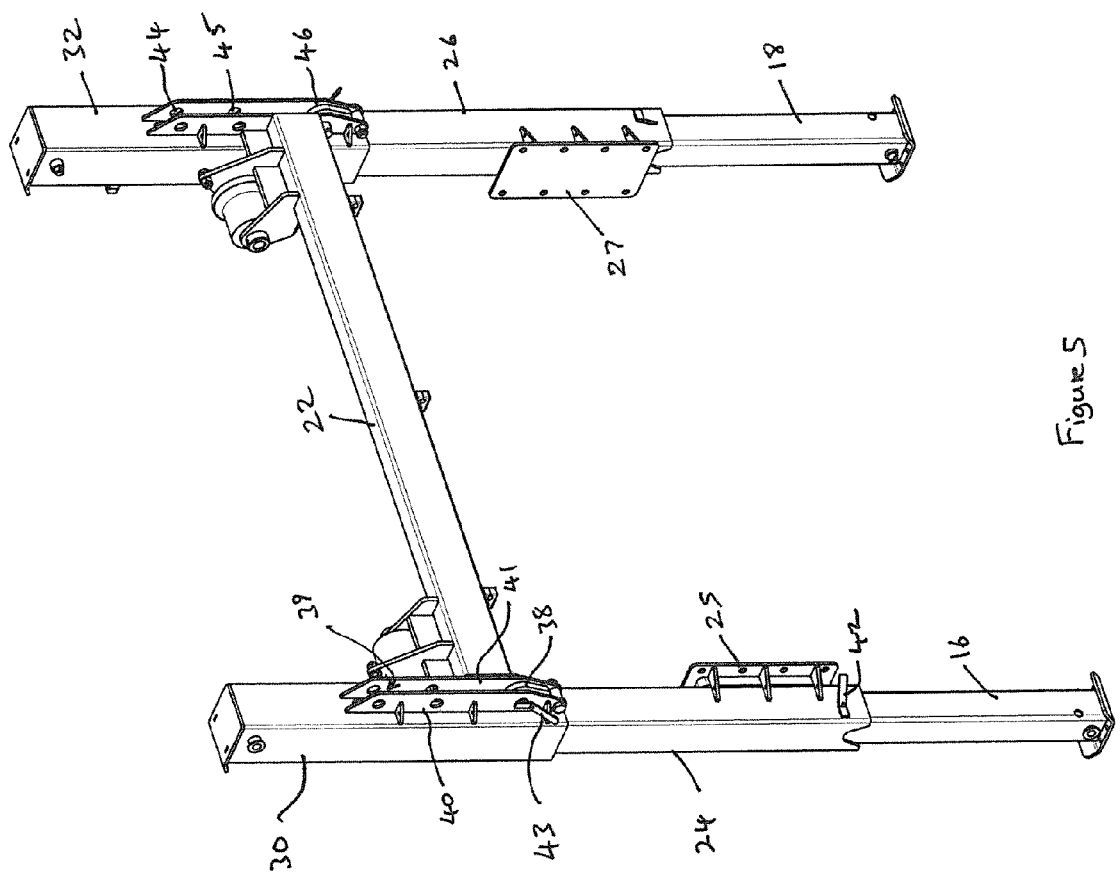
FIG. 5 is a perspective partial view of the support structure of FIG. 1, showing the jacking legs in their extended position and the feed conveyor support beam in its fully raised position.
Figure 6:
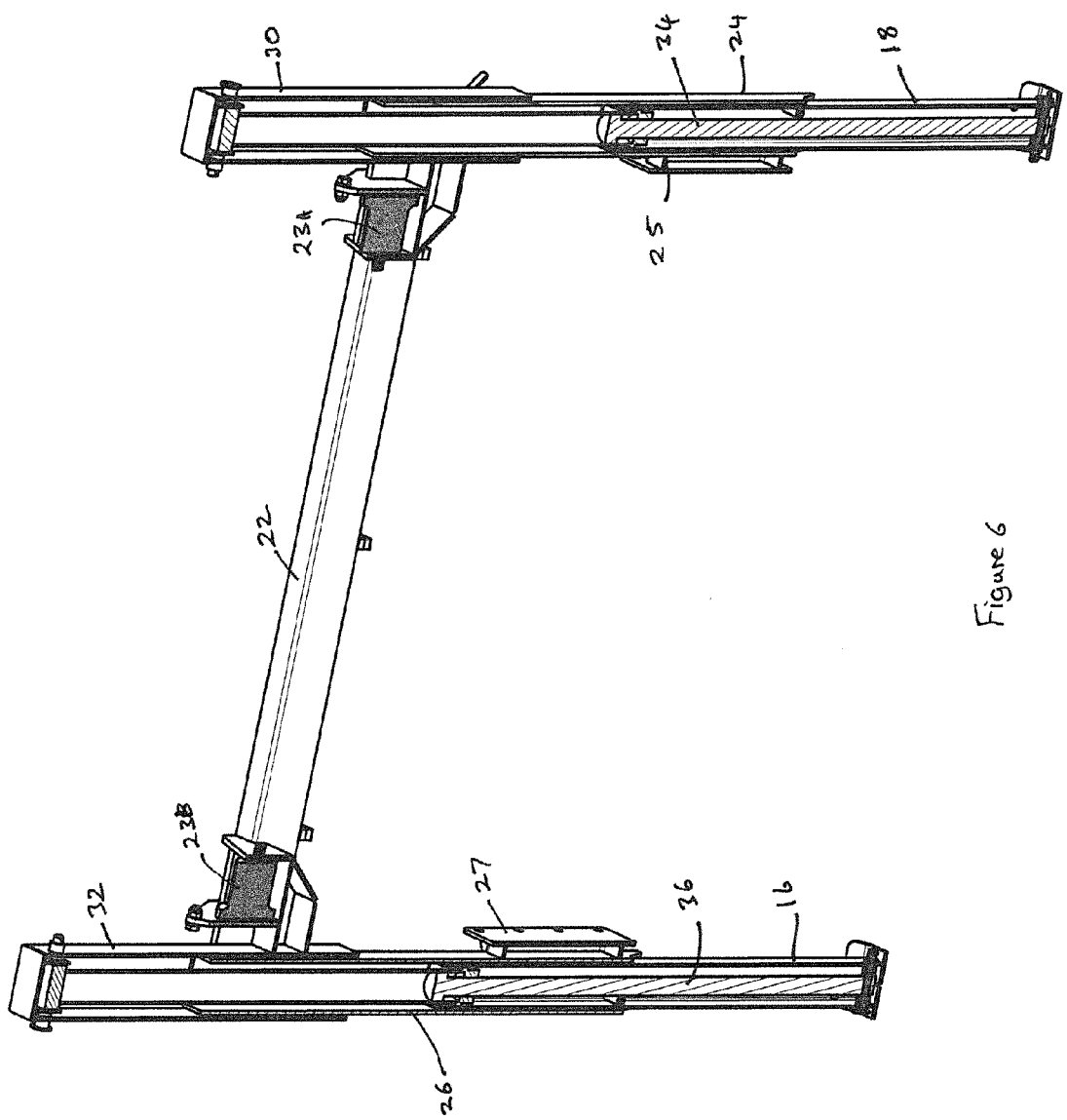
FIG. 6 is a sectional perspective view of the support structure of FIG. 1 showing the jacking legs in their extended position and the feed conveyor support beam in its fully raised position.

The discharge end of the feed conveyor 14 is pivotally mounted on the chassis 13 to allow the feed conveyor 14 to be tilted about a horizontal axis 20 extending transverse to a longitudinal axis of the chassis 13 to enable the angle of inclination of the feed conveyor 14 to be adjusted. The loading end of the feed conveyor 14 is supported on a support beam 22, extending transverse to the longitudinal axis of the chassis 13. As can be seen from FIG. 2, support rollers 23A, 23B are mounted on an upper side of the support beam 22, adjacent each end thereof, for supporting a lower side of the feed conveyor 14 thereon.

The support beam 22 is integrally mounted on the chassis 13 with the jacking legs 16,18, providing a particularly compact and efficient arrangement, as will be described below in more detail.

As illustrated in FIGS. 2 to 6, the jacking legs 16,18 are mounted on the chassis 13 via respective vertically arranged mounting posts 24,26 mounted on either side of the chassis 13 at a rear end thereof, each mounting post 24,26 comprising an elongate square section tubular body having a respective flange 25,27 welded on one side thereof at a lower end thereof by means of which the mounting post 24,26 is bolted to a respective side of the chassis 13 such that the tubular body of each mounting post 24,26 extends upwardly from the chassis 13. A respective jacking leg 16,18 is slidably located within each mounting post 24,26 to be vertically slideable within the respective mounting post 24,26 between retracted and extended positions, the tubular body of the mounting post 24,26 defining a housing for the jacking leg 16,18 when it is in its retracted position.

Each jacking leg 16,18 comprises a square section tube having a foot 28A,28B provided at a lower end thereof, said tube being dimensioned to fit within the tubular body of the respective mounting post 24,26.

The support beam 22 is mounted on the chassis by a pair of elongate vertically arranged tubular support members 30,32 provided at either end of the support beam 22, each support member 30,32 being located over a respective mounting post 24,26 to be slidably received thereon.

A hydraulic ram 34,36 is mounted within each mounting post 24,26 to act between the respective jacking leg 16,18 and the support member 30,32 of the support beam 22 associated therewith, such that each ram 34,36 can be extended to extend the jacking legs 16,18 to their extended positions and to selectively raise the support members 30,32 of the supper beam with respect to the mounting posts 24,26 to raise the height of the support beam 22, and thus the height of the loading end of the feed conveyor 14.

A respective tab 38 extends from a side of each mounting post 24,26 to be received with an elongate slot 39 formed in a side of the respective support member 30,32 of the support beam 22, a pair of flanges 40,41 being provided on either side of the slot 39 of each support member 30,32.

A pin receiving aperture is provided in each tab 38 and aligned pairs of apertures 44,45,46 are provided at vertically spaced locations in the flanges 40,41 on either side of each slot 39, so that the vertical position of the support beam 22 can be fixed in an uppermost or fully raised position, a lowermost or fully lowered position and one or more intermediate positions by inserting an upper locking pin 43 through selected aligned apertures 44,45,46 in the flanges 40,41 and through the pin receiving aperture in the tab 38 of the respective mounting post 24,26.

Further (lower) locking pins 42 may be provided to be insertable through respectively aligned apertures in the mounting posts 24,26 and the jacking legs 16,18 for locking the jacking legs 16,18 in their retracted or extended positions.

In use, when it is desired to extend the jacking legs 16,18 to support and stabilise the rear end of the machine 10, the lower locking pins 42 are removed and the rams 34,36 are extended to extend the jacking legs 16,18 from their retracted position to their ground engaging extended position. At such time, the height of the support beam 22 is fixed by means of the locking pins 43 inserted through the appropriate apertures in the flanges 40,41 of the support members 30,32 of the support beam 22 and respective tabs 38 of the mounting posts 24,26, locking the support members 30,32 in position on the support posts 24,26. The lower locking pins 42 are subsequently reinserted to lock the jacking legs 16,18 in position.

When it is desired to adjust the vertical position of the loading end of the feed conveyor 14 with respect to the chassis 13, to adjust the angle of inclination of the feed conveyor 14, the upper locking pins 43 are removed and the rams 34,36 are extended or retracted to raise or lower the support members 30,32, and thus the support beam 22, with respect to the mounting posts 24,26. Once the support beam 22 is at the desired height, the upper locking pins 43 are inserted through the apertures in the flanges 40,41 of each slot and the aperture in the tab 38 of the mounting post 24,26 aligned therewith to lock the support beam 22 in position with respect to the chassis 13.

The invention is not limited to the embodiment described herein, which may be modified without departing from the scope of the invention.

The invention claimed is:

1. An apparatus for coupling first and second parts to an intermediate part, said apparatus comprising a first member connectable to said first part, said first member being mounted on an intermediate member connectable to said intermediate part such that said first member can be moved between an extended position and a retracted position with respect to said intermediate member to adjust the position of the first part with respect to said intermediate part, the apparatus further comprising a second member connectable to said second part, said second member being mounted on said intermediate member such that said second member can be moved between an extended position and a retracted position with respect to said intermediate member to adjust the position of the second part with respect to said intermediate part, an actuator acting between the first member and the second member, said actuator being operable to move the first member between its retracted and extended positions and to move the second member between its retracted and extended positions.

2. An apparatus as claimed in claim 1, wherein said actuator comprises a linear actuator, said first and second members being arranged for movement between their respective retracted and extended positions along a common axis.

3. An apparatus as claimed in claim 2, wherein said actuator comprises a hydraulic or pneumatic ram.

4. An apparatus as claimed in claim 2, wherein said first member, second member and intermediate member are telescopically coupled to one another.

5. An apparatus as claimed in claim 4, wherein said first, second and intermediate members comprise nested tubular members.

6. An apparatus as claimed in claim 1, wherein one or more locating means are provided adapted to selectively lock the position of the first and/or second member with respect to the intermediate member.

7. An apparatus as claimed in claim 1, wherein said first member comprises a support member for supporting a part of a machine, said second member comprises a ground engaging member for supporting or stabilising a body of the machine, said intermediate member comprises a mounting member for attachment to a body of the machine.

8. An apparatus as claimed in claim 1, wherein said first and second members are moveable towards their respective extended position in opposite directions with respect to said intermediate member.

9. A support assembly for supporting a part of a machine, the support assembly comprising: a support member for supporting a part of the machine on a base, the support member being slidably mounted on a mounting member on the base to be displaceable with respect to the mounting member between a retracted position and an extended position to lower and raise, respectively, said part of the machine with respect to said base; a jacking leg extendable from a lower end of the mounting member between a retracted position and an extended position; a ram acting between the jacking leg and the support member, said ram being operable to move the jacking leg between its retracted and extended positions and to move the support member between its retracted and extended positions to adjust the position of said part of the machine relative to the base.

10. A support assembly as claimed in claim 9, wherein at least one locating means are provided for selectively fixing the position of the support member and/or the jacking leg with respect to the base.

11. A support assembly as claimed in claim 10, wherein said at least one locating means comprises a respective locking member, such as a locking pin, to be received in aligned receiving apertures provided on cooperating portions of the respective mounting member and support member or jacking leg when the support member or jacking leg is in its retracted and/or extended position and/or one or more intermediate positions with respect to the mounting member.

12. A support assembly as claimed in claim 9, wherein the support member and jacking leg are arranged to be telescopically extendable with respect to the mounting member.

13. A support assembly as claimed in claim 12, wherein the mounting member comprises a tubular body adapted to receive the jacking leg therein in sliding engagement with an inner surface of the tubular body.

14. A support assembly as claimed in claim 13, wherein the support member comprises a tubular body adapted to be received over the mounting member in sliding engagement with an outer surface of the mounting member.

15. A support assembly as claimed in claim 13, wherein the mounting member comprises an elongate tubular post mounted on the base, the jacking leg being received within the mounting member in telescopic manner.

16. A support assembly as claimed in claim 9, wherein said support member and said jacking leg are moveable towards their respective extended position in opposite directions with respect to said mounting member.

17. A mobile aggregate processing apparatus comprising in operative combination:
a frame having a longitudinal direction:
at least one material processing plant configured to perform at least one of feeding material, washing material, sorting material into first predetermined material dimension groups and crushing material with a first larger dimension characteristic into material having a first smaller dimension characteristic;

a feed conveyor having a loading end and a discharge end, material from said discharge end being delivered to said material processing plant, wherein the loading end of the feed conveyor is supported on an elongate support beam extending transverse to the longitudinal direction of the frame;

a tubular support member being provided at each end of the support beam, each support member being mounted on a respective mounting member provided on each side of the frame to be displaceable with respect to the respective mounting member between a lowered position and a raised position;

an elongate jacking leg being mounted on each mounting member to be displaceable with respect to the respective mounting member extendable between a retracted position to an extended ground engaging position;

a ram being associated with each jacking leg, each ram acting between the respective jacking leg and the associated support member such that extension of the rams may extend the jacking legs towards their extended ground engaging position and may extend the support members from their lowered position to their raised position to raise the support beam and thus raise the loading end of the feed conveyor.

18. An apparatus as claimed in claim 17, wherein locating means are provided for selectively fixing the position of the support members with respect to the respective mounting members to fix the support beam in its lowered position and/or its raised position and/or one or more intermediate positions therebetween.

19. An apparatus as claimed in claim 17, wherein locating means are provided for selectively fixing the position of the jacking legs with respect to the mounting members to fix the jacking legs in their in their retracted and/or extended positions and/or one or more intermediate positions therebetween.

20. A material processing machine comprises a feed conveyor wherein a loading end of the feed conveyor is supported on a support assembly, the support assembly comprising: a support member for supporting said loading end on a base, the support member being slidably mounted on a mounting member on the base to be displaceable with respect to the mounting member between a retracted position and an extended position to lower and raise, respectively, said loading end with respect to said base; a jacking leg extendable from a lower end of the mounting member between a retracted position and an extended position; a ram acting between the jacking leg and the support member, said ram being operable to move the jacking leg between its retracted and extended positions and to move the support member between its retracted and extended positions to adjust the position of said part of the machine relative to the base.

* * * * *

UNITED STATES PATENT AND TRADEMARK OFFICE
CERTIFICATE OF CORRECTION

PATENT NO.      : 9,260,249 B2
APPLICATION NO. : 14/074352
DATED           : February 16, 2016
INVENTOR(S)     : Glenn Murphy and Oliver Donnelly Page 1 of 1

It is certified that error appears in the above-identified patent and that said Letters Patent is hereby corrected as shown below:

In the claims

Claim 19, Col. 8, Line 8: "in their in their" should be "in their"

Signed and Sealed this
Tenth Day of May, 2016

Michelle K. Lee
*Director of the United States Patent and Trademark Office*